(12) United States Patent
Urushidani et al.

(10) Patent No.: US 8,170,738 B2
(45) Date of Patent: May 1, 2012

(54) PERFORMANCE INSPECTION METHOD FOR AUTONOMOUS MOBILE APPARATUS, AND PERFORMANCE INSPECTION SHEET THEREFOR

(75) Inventors: Shinzo Urushidani, Tochigi (JP); Eiji Ninomiya, Tochigi (JP)

(73) Assignee: Honda Motor Co., Ltd, Tokyo (JP)

( * ) Notice: Subject to any disclaimer, the term of this patent is extended or adjusted under 35 U.S.C. 154(b) by 324 days.

(21) Appl. No.: 12/614,639

(22) Filed: Nov. 9, 2009

(65) Prior Publication Data

US 2010/0152921 A1    Jun. 17, 2010

(30) Foreign Application Priority Data

Dec. 12, 2008   (JP) .................................. 2008-316521

(51) Int. Cl.
*G01C 22/00*   (2006.01)

(52) U.S. Cl. .......................................................... 701/23

(58) Field of Classification Search ................. 701/2, 23; 700/245, 258; 340/539.13, 988, 989
See application file for complete search history.

(56) References Cited

U.S. PATENT DOCUMENTS

| | | | |
|---|---|---|---|
| 2005/0218292 A1 | 10/2005 | Kawabe et al. | |
| 2007/0135966 A1* | 6/2007 | Kawaguchi et al. | 700/245 |
| 2007/0276558 A1 | 11/2007 | Kim | |
| 2008/0238365 A1 | 10/2008 | Kaneko et al. | |

FOREIGN PATENT DOCUMENTS

| | | |
|---|---|---|
| JP | 09-149309 A | 6/1997 |
| JP | 2006-192562 A | 7/2006 |
| KR | 10-2006-0043147 A | 5/2006 |
| WO | WO 02/091095 A1 | 11/2002 |

* cited by examiner

*Primary Examiner* — Kim T Nguyen
(74) *Attorney, Agent, or Firm* — Arent Fox LLP (57) ABSTRACT

An autonomous mobile apparatus (R) at a reference position (1) is confronted to a subject (T) with a predefined distance. The autonomous mobile apparatus (R) is rotated at the reference position (1) to confront plural directions sequentially. The subject (T) is detected every time when the autonomous mobile apparatus (R) is rotated to confront each direction to determine whether or not it is functioning normally.

5 Claims, 5 Drawing Sheets

PERFORMANCE INSPECTION METHOD FOR AUTONOMOUS MOBILE APPARATUS, AND PERFORMANCE INSPECTION SHEET THEREFOR

BACKGROUND OF THE INVENTION

1. Field of the Invention

The present invention relates to a performance inspection method for an autonomous mobile apparatus capable of performing free motions autonomously according to communication with a remote operation device to inspect whether or not each detection element in a plurality of detection elements provided in the autonomous mobile apparatus for detecting a specific subject in a surrounding environment thereof is functioning normally, and a performance inspection sheet therefor.

2. Description of the Related Art

As an autonomous mobile apparatus, an autonomous mobile robot, for example, may be given. Experiments have been carried out on this type of robot by applying thereto various functions such as environment recognition and autonomous motion so as to make it perform various operations such as transporting an article. By mounting in the robot various kinds of detection elements for recognizing an external state thereof, it is expected that the robot can avoid contacting an object and can perform operations smoothly (refer to Japanese Patent Laid-open No. 2006-192562).

However, if a detection element mounted in the robot is not functioning normally, it is not possible for the robot to avoid contacting an object when the robot moves autonomously, accordingly, it is impossible for the robot to perform autonomous motions smoothly. Therefore, an inspection is necessary to be performed to check whether or not the detection element mounted in the robot is functioning normally. In detail, firstly, the robot is located at a reference position, and then, a subject to be detected by the detection element mounted in the robot is set with a predefined distance from the robot. The robot performs detection processing of the subject under this situation.

Herein, a plurality of detection elements are mounted in the robot in order to detect an object located not only in the front but also in either the left or right direction or at the back thereof. The detection regions of each of the detection elements are arranged in a radial pattern. An operator suspends the robot located at the reference position from the floor by using a suspension device and rotates the robot. When the robot is rotated sequentially to confront plural directions, it performs the subject detection in each direction it is confronted. In this manner, without disposing plural subjects at the circumference of a circle around the robot, whether or not each of the detection elements is functioning normally in detecting the whole environment surrounding the robot can be inspected only by setting a subject on a line passing through the reference position.

However, the aforementioned operation is troublesome since the suspension device must be used to confront the robot to the plural directions sequentially. Moreover, an installation space is needed to set up the suspension device. Even when an autonomous mobile apparatus, namely an autonomous robot is used in a household or the like, it is desired to inspect the functions at the initiation of the autonomous mobile robot. However, for a common household, it is relatively narrow inside; therefore, it is difficult to set up the suspension device therein. Moreover, it is disadvantage to confront the robot to a predefined direction when it is being suspended, since it is troublesome to perform the operation of adjusting rotation angles of the robot accurately.

SUMMARY OF THE INVENTION

The present invention has been accomplished in view of the aforementioned problems, and it is therefore an object of the present invention to provide a performance inspection method for an autonomous mobile apparatus to inspect whether or not a plurality of detection elements mounted in the autonomous mobile apparatus are functioning normally in an easy, instant and accurate manner even in a relatively restricted space.

The present invention provides a performance inspection method for an autonomous mobile apparatus which is capable of performing free motions autonomously according to communication with a remote operation device, mounted with a plurality of detection elements having mutually different detection regions and configured to detect a specific subject in a surrounding environment thereof, the performance inspection method is configured to inspect whether or not each detection element is functioning normally, wherein the autonomous mobile apparatus includes a main body and a locomotion mechanism mounted in the main body to navigate the main body and rotate the main body at a specific position, and the performance inspection method comprises: a position adjusting step configured to locate the autonomous mobile apparatus at a reference position and confront the autonomous mobile apparatus to the subject with a predefined distance; a rotation step configured to confront the autonomous mobile apparatus to a plurality of predefined directions sequentially by rotating the autonomous mobile apparatus at the reference position via the locomotion mechanism; a detection processing step configured to detect the subject via each detection element every time when the autonomous mobile apparatus is confronted to each direction by the rotation step; and a determination step configured to determine whether or not each detection element is functioning normally on the basis of the detection processing result from the detection processing step.

As the autonomous mobile apparatus, there may be given a bipedal walking robot with legs thereof served as the locomotion mechanism, a crawler-type mobile robot with a crawler thereof served as the locomotion mechanism, a wheel-type mobile robot (including an automobile) with a wheel served as the locomotion mechanism or the like.

According to the present invention, the autonomous mobile apparatus can be rotated without using the conventional device such as a suspension device, and the inspection on the plurality of detection elements mounted in the autonomous mobile apparatus can be performed easily without disposing a plurality of subjects around the autonomous mobile apparatus, therefore, the inspection can be performed on each detection element instantly and accurately in a space which is relatively narrow, for example, a kitchen in a household. Moreover, since the autonomous mobile apparatus is rotated at the reference position by the locomotion mechanism, it is possible to confirm whether or not the rotation at the specific position is performed correctly. Thus, the efficiency can be improved when plural inspections are performed.

Further, in the present invention, the autonomous mobile apparatus is provided with a main body and a revolving portion capable of revolving freely with respect to the main body, and the plurality of detection elements are mounted in the revolving portion, the performance inspection method comprises: a position adjusting step configured to locate the autonomous mobile apparatus at the reference position and confront the autonomous mobile apparatus to the subject with a predefined distance; a revolution step configured to confront the revolving portion to a plurality of predefined directions sequentially by revolving the revolving portion while maintaining the autonomous mobile apparatus at the reference position; a detection processing step configured to detect the subject via each detection element every time when the revolving portion is confronted to each direction by the revolution step; and a determination step configured to determine whether or not each detection element is functioning normally on the basis of the detection processing result from the detection processing step.

When the autonomous mobile apparatus is provided with the revolving portion and the revolving portion is disposed with a plurality of detection elements, the inspection on the plurality of detection elements disposed in the revolving portion can be performed easily and instantly by rotating the revolving portion without the necessity of disposing a plurality of subjects around the autonomous mobile apparatus.

Furthermore, in the present invention, the autonomous mobile apparatus is provided with a main body, a locomotion mechanism mounted in the main body to navigate the main body and rotate the main body at the reference position, and a revolving portion capable of revolving freely with respect to the main body, and the plurality of detection elements are mounted in the revolving portion, the performance inspection method comprises: a position adjusting step configured to locate the autonomous mobile apparatus at the reference position and confront the autonomous mobile apparatus to the subject with a predefined distance; a rotation step configured to confront the autonomous mobile apparatus to a plurality of predefined directions sequentially by rotating the autonomous mobile apparatus at the reference position via the locomotion mechanism; a revolution step configured to confront the revolving portion to a plurality of predefined directions sequentially by revolving the revolving portion while maintaining the autonomous mobile apparatus at the reference position; a detection processing step configured to detect the subject via each detection element every time when the revolving portion is confronted to each direction by the rotation step and the revolution step; and a determination step configured to determine whether or not each detection element is functioning normally on the basis of the detection processing result from the detection processing step.

When the autonomous mobile apparatus is, for example, a bipedal walking robot with legs thereof served as the locomotion mechanism, it is designed to perform motions without applying a strange feeling to a human being. In other words, this kind of robot is configured to be able to perform bending and stretching movements of arms and legs at a plurality of joints corresponding to a plurality of joints of a human being, such as the shoulder joint, the elbow joint, the wrist joint, the hip joint, the knee joint and the ankle joint, and to perform works in the same way as a human being in, for example, a household. Moreover, this type of robot includes a head served as the revolving portion, and the head is configured to have an allowable revolution angle equal to that of a human being to avoid applying a strange feeling to a human being. According to the present invention, not only in a case where the main body is directed to the plurality of direction sequentially in the rotation step, but also in another case where the revolution step is performed when the main body is confronted to each direction and the revolution range of the revolving portion (the head) is set to be the same as that of a human being, the highly accurate inspection can be performed on the plurality of detection elements mounted in the revolving portion easily and instantly.

In the present invention, as a detailed method to perform the rotation step, a plurality of floor marks are set on the circumference of a circle centered at the reference position in accordance with the plurality of predefined directions to be confronted by the autonomous mobile apparatus, and when the autonomous mobile apparatus is rotated in the rotation step, the autonomous mobile apparatus detects the floor marks and is directed to confront the plurality of predefined directions sequentially on the basis of the floor marks. Accordingly, when the autonomous mobile apparatus is directed to a predefined direction, the accuracy thereof can be improved dramatically.

Moreover, the present invention provides a performance inspection sheet for an autonomous mobile apparatus which is capable of performing free motions autonomously according to communication with a remote operation device, mounted with a plurality of detection elements having mutually different detection regions and configured to detect a specific subject in a surrounding environment thereof, the performance inspection sheet is configured to inspect whether or not each detection element is functioning normally and it comprises: a reference position where the autonomous mobile is located according to communication with the remote operation device, and at least one set of floor marks which are disposed in accordance with the directions confronted by the autonomous device at the reference position to be detected by the autonomous mobile device, wherein the sheet can expanded in the inspection and folded freely for storing.

According to the present invention, the reference position can be set easily by expanding the sheet of the present invention on the floor when it is used in inspection and the sheet can be folded compactly for storing.

DETAILED DESCRIPTION OF THE PREFERRED EMBODIMENTS

Figure 1:
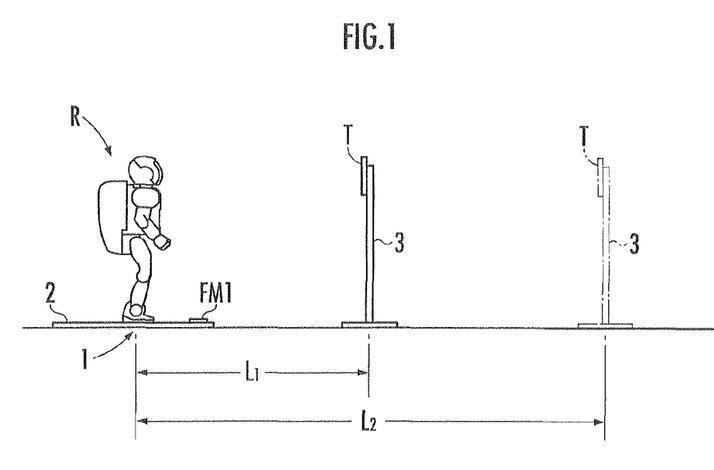
FIG. 1 is a side view illustrating the inspection state according to an embodiment of the present invention.
Figure 2:
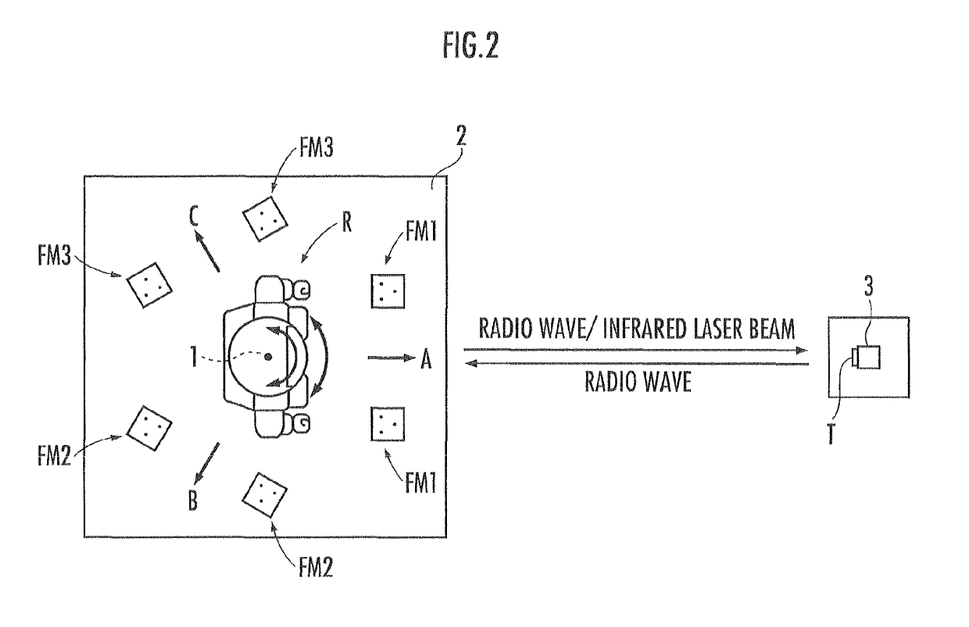
FIG. 2 is a top view illustrating the inspection state according to an embodiment of the present invention.

Hereinafter, an embodiment of the present invention will be described in detail with reference to the drawings. As illustrated in FIG. 1 and FIG. 2 of the present embodiment, a robot R is located at a reference position 1, and the detection performance of detecting a later-described RFID tag T (subject) by the robot R is inspected. As illustrated in FIG. 2, the reference position 1 is disposed on a rectangular sheet 2. The sheet 2 in the present embodiment is configured to be foldable and can be expanded on a floor when used in the inspection. According thereto, the reference position 1 can be set easily, and the sheet 2 can be folded compactly for storing. Three sets of floor marks FM1, FM2 and FM3, each set containing two floor marks, are disposed on the sheet 2 at the circumference of a circle centered at the reference position 1. Each of floor marks FM1, FM2 and FM3 has three dots thereon to designate directions. The central position between the first set of floor marks FM1 is set as the first direction A, the central position between the second set of floor marks FM2 is set as the second direction B and the central position between the third set of floor marks FM3 is set as the third direction C. The first to third directions A, B and C are separated by 120°, having the reference position 1 as the central point. In the present embodiment, the reference position 1 and the floor marks FM1, FM2 and FM3 are disposed on the sheet 2; however, it is acceptable to dispose the reference position 1 and the floor marks FM1, FM2 and FM3 on the floor directly.

As illustrated in FIG. 1, the RFID tag T is attached to a stand 3, and the tag stand 3 is set at a position located on a line passing through the reference position 1 with a predefined distance to the robot R. The tag stand 3 may be set at a position where appropriate. In the present embodiment, the inspection is performed by setting the tag stand 3 at a position with a distance L1 (2 m) from the robot R firstly, and then at another position with a distance L2 (4 m) from the robot R.

Figure 3:
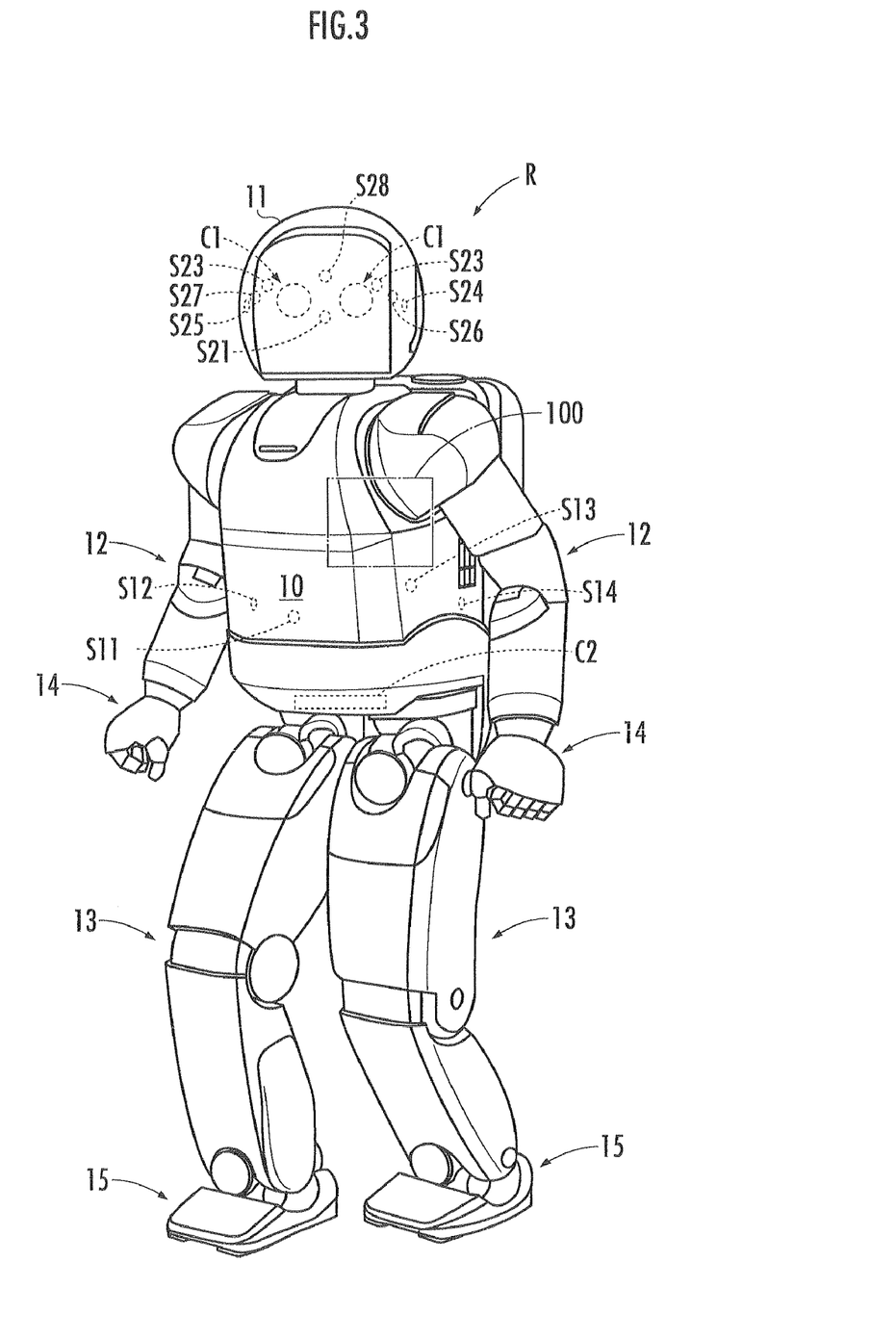
FIG. 3 is an explanatory diagram illustrating a structural configuration of a robot used in an embodiment of the present invention.

Hereinafter, the description will be given on the robot R which is adopted as an autonomous mobile apparatus in the present embodiment. The robot R is the so-called bipedal robot which simulates motions of a human being. Specifically, as illustrated in FIG. 3, the robot R is provided with a main body 10, a head 11 (revolving portion) disposed at the top of the main body 10, a pair of left and right arms 12 extended from both lateral sides of an upper portion of the main body 10, a hand 14 attached to the end portion of the arm 12, a pair of left and right legs 13 (locomotion mechanism) extended from the beneath of the main body 10, and a foot 15 attached to the end portion of the leg 13. As disclosed in Japan Domestic re-publication of PCT international application 2003-090978 and 2003-090979, according to a force transmitted from an actuator 1000 (refer to FIG. 5), the robot R can bend and/or stretch the arms 12 or the legs 13 at a plurality of joints corresponding to a plurality of joints of a human being, such as the shoulder joint, the elbow joint, the wrist joint, the hip joint, the knee joint and the ankle joint. Further, under the consideration that the robot R will assist a human being in working in a household, for example, it is designed to perform motions without applying a strange feeling to the human being. Therefore, the allowable revolution angle of the head 11 or the bending or stretching angle of each joint is set equal to that of the human being.

The robot R can make autonomous walking motions (including rotation motions at a specific position according to foot movements) according to iterated motions of each of the left and right legs 13 (or foot 15) by leaving and landing on the floor repeatedly. In addition to the robot R provided with a pair of left and right legs 13 of the present embodiment, the autonomous mobile apparatus may also be a crawler-type mobile robot having a crawler as the locomotion mechanism, a wheel-type mobile robot (including an automobile) having a wheel as the locomotion mechanism or the like.

The head 11 is mounted with a pair of head cameras (CCD camera) C1. The pair of head cameras C1 are disposed laterally, facing ahead of the robot R. The main body 10 is mounted with a waist camera C2. The waist camera C2 outputs infrared laser beams (electromagnetic wave) to a detection region located downward in front of the robot R, and outputs a signal according to the reflected infrared laser beams. The waist camera C2 is used to determine a position of an object located downward in front of the robot R, a direction or posture of the main body 10 of the robot R on the basis of the recognized shape and posture of the floor marks FM1, FM2 and FM3 (refer to FIG. 2).

As illustrated in FIG. 3, the main body 10 is provided with supersonic sensors S11 to S14. The supersonic sensors S11 to S14 outputs supersonic waves (elastic oscillation waves) to the detection regions spreading toward the front side, the right side, the back side and the left side of the robot R, respectively, and output a signal according to the reflected supersonic waves. The supersonic sensors S11 to S14 are used to determine a position of an object around the robot R.

Figure 4:
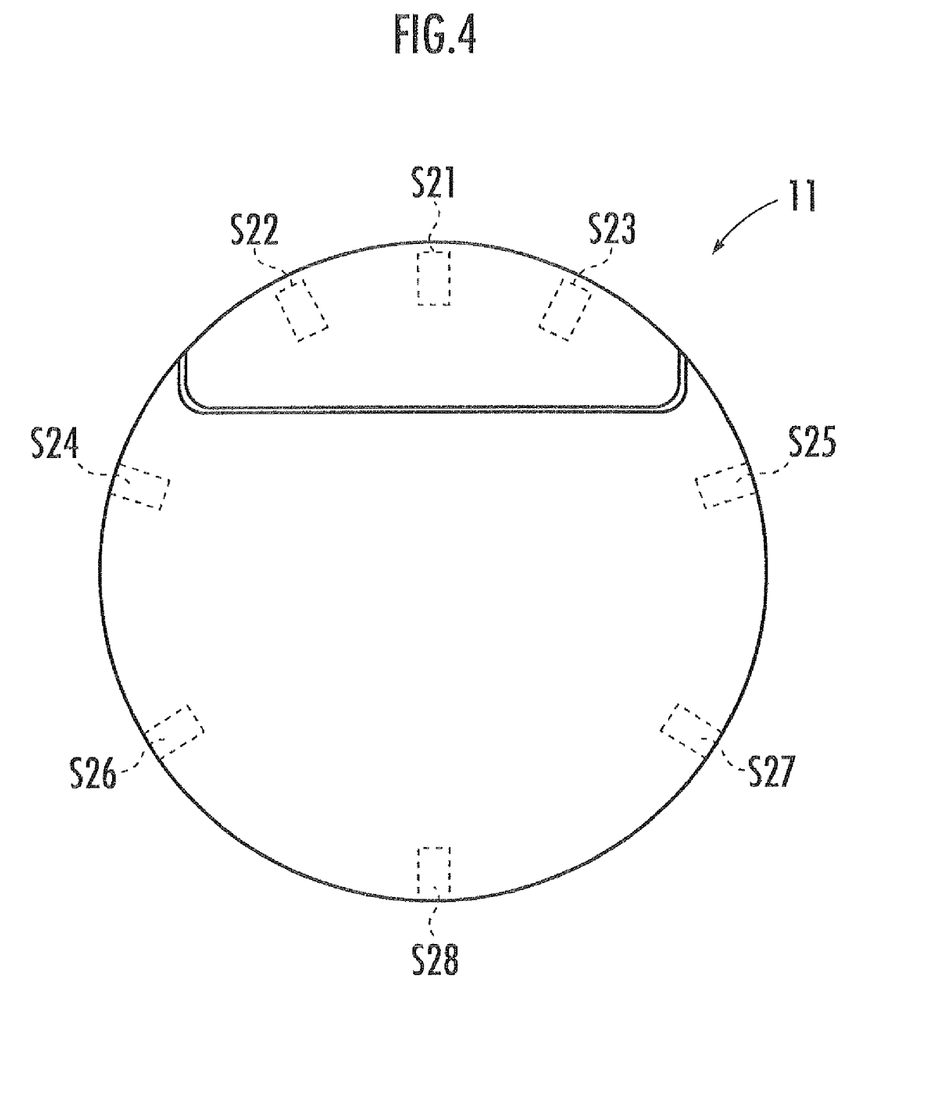
FIG. 4 is a top view of a head of the robot.

As illustrated in FIG. 3 and FIG. 4, the head 11 is provided with eight RFID readers S21 to S28 (detection elements in the present invention) configured to communicate with a RFID tag ported by a human being, or a RFID tag attached to an object. Each of the RFID readers S21 to S28 has a predefined directivity, and outputs electromagnetic waves (radio wave and infrared laser beams) from the head 11 of the robot R to different detection regions in a radial pattern. When the RFID tag T (refer to FIG. 1) receives the electromagnetic waves, in response it sends back electromagnetic waves. Each of the RFID readers S21 to S28 detects the RFID tag T according to the electromagnetic waves received, and recognizes a human being or an object. The detection regions for the RFID readers S21 to S28, respectively, are different from each other, and the adjacent detection regions are configured to have a partially overlapped portion. As illustrated in FIG. 4, the detection regions for the three RFID readers S21 to S23 disposed at the front side of the head 11 are separated at a relatively small angle of 25°; while the detection region for the RFID reader S28 disposed at the rear side of the head 11 and the detection regions for the two RFID readers S26 and S27 disposed laterally at positions backward to the frontal plane of the head 11, respectively, are separated at the widest angle of 60°.

Although not shown in the drawings, the RFID tag T is provided with an infrared light receiving element and a communication element. When the electromagnetic waves (radio wave and infrared light beams) from the robot R are received by the RFID tag T, it transmits an electromagnetic wave (radio wave) to the robot R in response.

It is acceptable to adopt detection regions having a spatial spreading different to each other as the detection regions for the supersonic sensors S11 to S14, the RFID readers S21 to S28 and the waist camera C2, respectively. It is also acceptable to appropriately alter the number of the supersonic sensors S11 to S14, the RFID readers S21 to S28 and the waist camera C2 according to the spatial spreading of the detection region, the usage or the role of the robot R, or the like. Furthermore, in addition to the supersonic sensors S11 to S14, the RFID readers S21 to S28 and the waist camera C2, it is acceptable to mount in the robot R various other sensors which can output various kinds of electromagnetic waves or elastic oscillation waves (supersonic wave, sound wave), output signals according to the reflected waves and have directivity.

Figure 5:
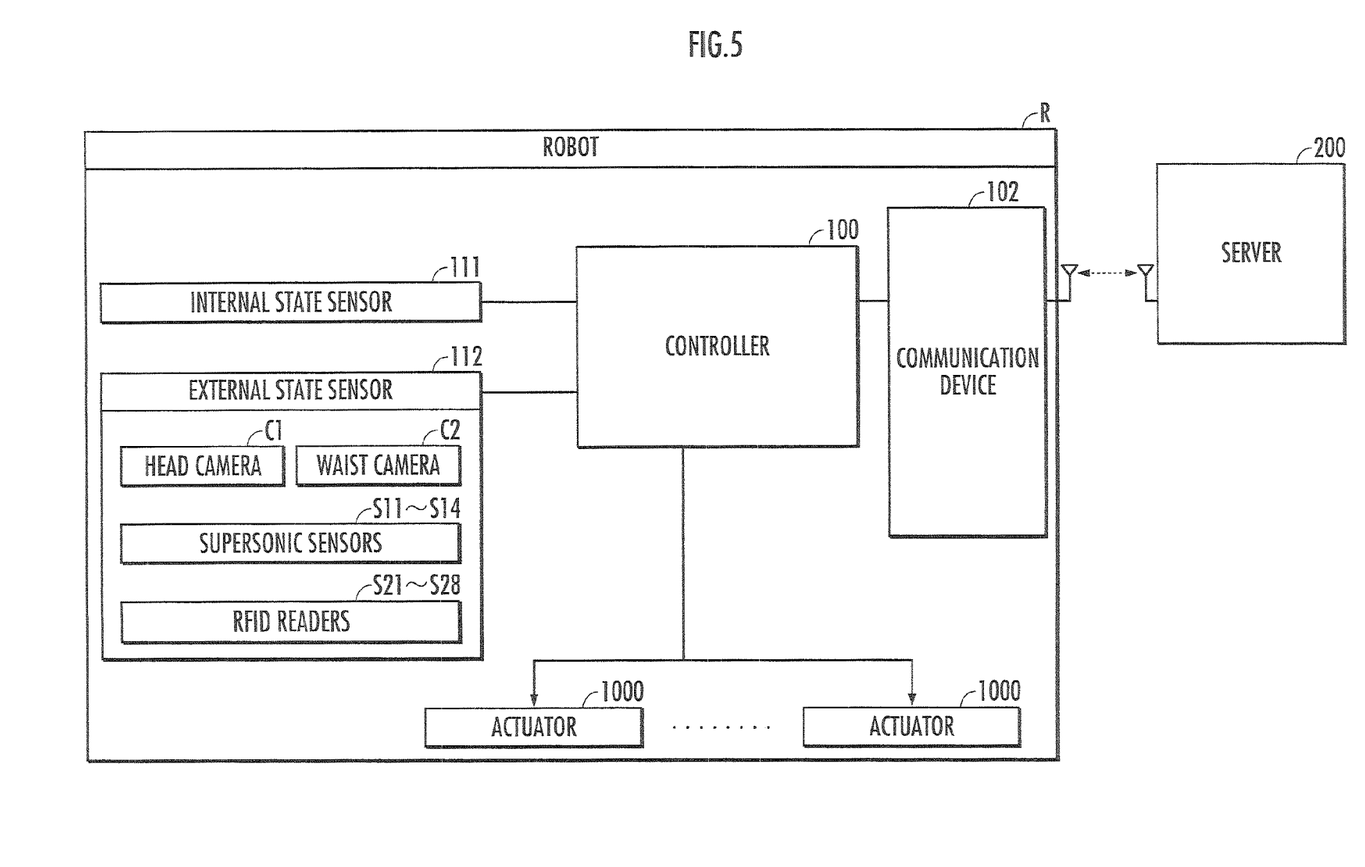
FIG. 5 is an explanatory diagram illustrating a configuration of a controller provided in the robot.

As illustrated in FIG. 5, the robot R is provided with a controller 100 and a communication device 102. The controller 100 is composed of an ECU or a computer (including a CPU, a ROM, a RAM, an I/O and the like) as the hardware. In a memory of the computer, a controlling program (software) is stored.

The controller 100 controls motions of the arms 12 or the legs 13 through controlling the operations of each actuator 1000 on the basis of output signals from an internal state sensor 111 and an external state sensor 112 and the like. The internal sensor 111 is configured to determine an internal state or a behavior of the robot R. Various sensors, such as a gyro sensor which outputs signals according to the acceleration of the main body 10, a rotary encoder which outputs signals according to joint angles of each joint, a force sensor which outputs signals according to a floor reaction force applied to the legs 13, correspond to the internal state sensor 111. The external sensor 112 is configured to determine a behavior or the like of an object, an external state or environment of the robot R. The head cameras C1, the waist camera C2, the supersonic sensors S11 to S14, the RFID readers S21 to S28 and the like correspond to the external state sensor 112. In addition to a driving source such as an electric motor, the actuator 1000 is composed of a reduction gear disposed between an output shaft of the driving source and a link constituting the arm 12 or the leg 13, or a flexible element such as an elastic member.

The controller 100 controls the robot R to perform a predefined operation according to a command issued to the robot R from a server 200 (remote control element). The server 200 is provided with a personal computer or the like and is configured to collect and display inspection data from the RFID readers S21 to S28 to be described hereinafter. Moreover, the controller 100 adjusts the sensitivities of the RFID readers S21 to S28 according to a command issued from the server 200.

Figure 6:
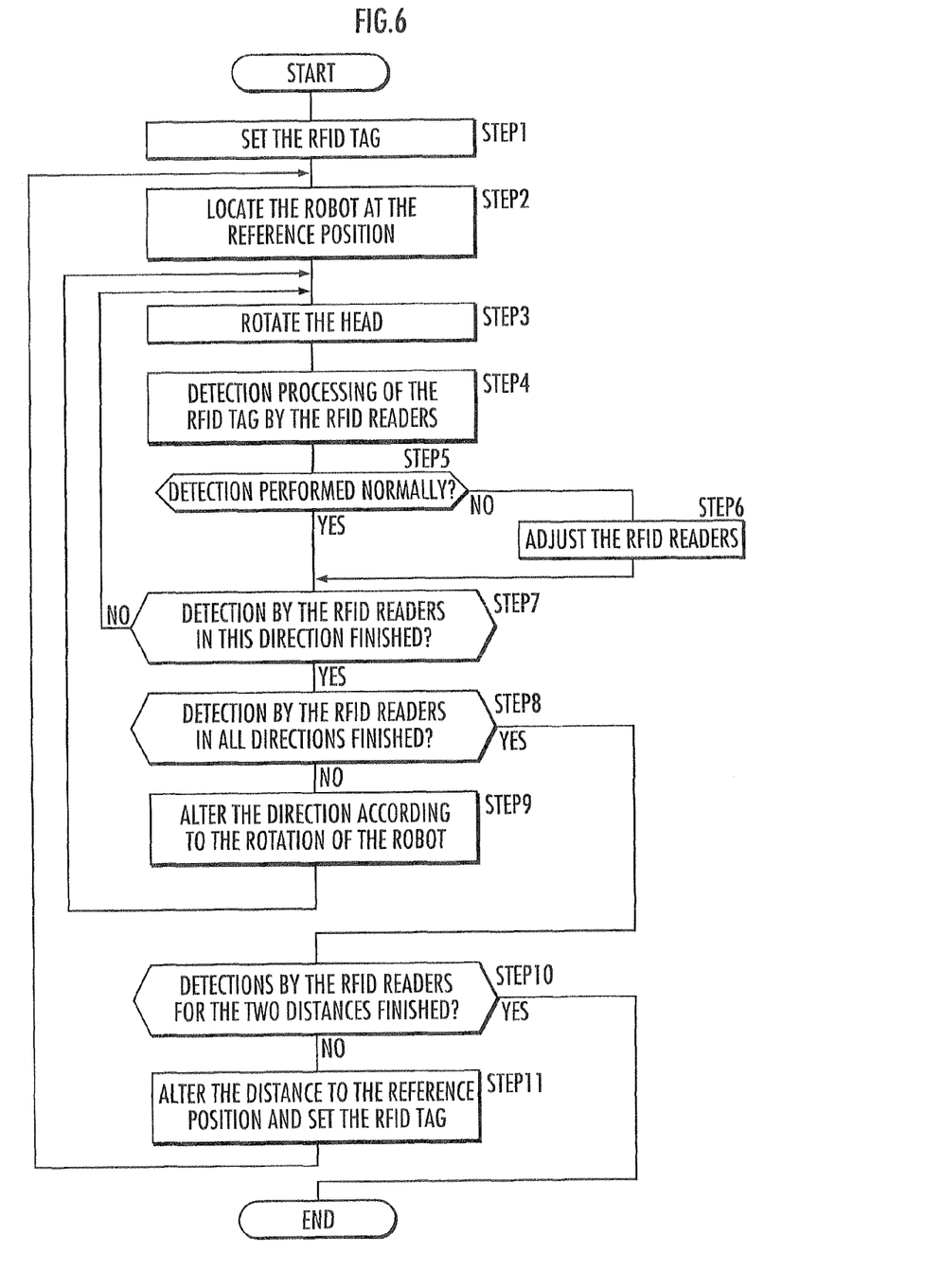
FIG. 6 is a flow chart illustrating an inspection method according to an embodiment of the present invention.

Hereinafter, the description will be given on the inspection (performance inspection) of the RFID readers S21 to S28 provided in the robot R with the aforementioned configurations according to FIG. 6. First, as illustrated in FIG. 2, the sheet 2 is expanded on the floor and the RFID tag T is set at a position along the first direction A with a distance L1 (2 m) from the reference position 1 in STEP 1. Thereafter, in STEP 2, a command is issued from the server 200 to the robot R to locate the robot R at the reference position 1. Accordingly, the robot R identifies the floor marks FM1 of the first set via the waist camera C2, performs fine adjustment through foot movements to confront the main body 10 to the first direction A correctly (position adjusting step).

Subsequently, in STEP 3, a command is issued from the server 200 to the robot R to rotate the head 11 (revolution step). In STEP 4, one of the RFID readers performs communication with the RFID tag T in the revolution range and the detection (communication) result of the RFID tag T by the RFID reader is stored in the server 200 (detection processing step). Then, the detection result is displayed on the server 200 through a display of a personal computer or the like, and whether or not the RFID reader is functioning normally is determined (determination step). Thereafter, in STEP 5, if the detection of the RFIF reader on the RFID tag T is abnormal, the process moves to STEP 6 in which the sensitivity of the RFID reader is adjusted according to operations from the server 200. When the main body 10 of the robot R is facing to the first direction A, the RFID readers possible to perform communication with the RFID tag T when the head 11 is revolved are readers from S21 to S25 as illustrated in FIG. 4. Therefore, the process from STEP 3 to STEP 7 is iterated until the inspections on the five RFID readers S21 to S25 are completed in STEP 7. After the inspections on the five RFID readers S21 to S25 are completed, the process moves to STEP 8. If the inspections in the second direction B and the third direction C are not performed, the robot R is rotated in STEP (rotation step). In the rotation step, the robot R starts rotation through foot movements according to the command from the server 200, identifies the floor marks FM2 of the second set via the waist camera C2 and confronts the main body 10 to the second direction B. When the main body 10 of the robot R is facing to the second direction B, the RFID readers possible to perform communication with the RFID tag T when the head 11 is revolved are readers S24, S26 and S28 as illustrated in FIG. 4.

After the inspection on the RFID reader S24 is completed, the process from STEP 3 to STEP 7 is iterated to perform the inspections on the RFID readers S26 and S28, respectively. After the inspections on the RFID readers S26 and S28 are completed, the process moves from STEP 8 to STEP 9 where the robot R is rotated (rotation step). Herein, the robot R starts rotation through foot movements according to the command from the server 200, identifies the floor marks FM3 of the third set via the waist camera C2 and confronts the main body 10 to the third direction C. When the main body 10 of the robot R is facing to the third direction C, the RFID readers possible to perform communication with the RFID tag T when the head 11 is revolved are readers S25, S27 and S28 as illustrated in FIG. 4. Since the inspections on the RFID readers S25 and S28 are completed, the inspection on the RFID reader S27 is performed from STEP 3 to STEP 7. According thereto, the inspections and adjustments of all the RFID readers S21 to S28 on the detection of the RFID tag T located at the position with a distance L1 (2 m) from the reference position 1 are completed. Note that the RFID reader to be inspected in each direction is selected according to the attached position of every RFID reader.

Subsequently, the process moves to STEP 10 to check whether or not the inspections of the RFID readers S21 to S28 on the detection (communication) of the RFID tag T located at a position with a distance L2 (4 m) from the reference position 1 are performed. If the inspections are not performed, in STEP 11, the RFID tag T is set at the position with a distance L2 (4 m) from the reference position 1. Thereafter, the inspections and adjustments of all the RFID readers S21 to S28 on the detection of the RFID tag T located at the position with a distance L2 (4 m) from the reference position 1 are performed as mentioned above from STEP 2 to STEP 9.

According to the present invention, the inspections and adjustments can be performed on all the RFID readers S21 to S28 provided in the robot R through the rotation of the robot R at the reference position 1 via foot movements according to the command from the server 200 without using the conventional device such as a suspension device to suspend the robot R, therefore, the inspections can be performed instantly and accurately even in a relatively narrow room, for example, a kitchen in a household. Even the head 11 of the robot R is set to revolve in a revolution range the same as a human being without giving a strange feeling to the human being, all the RFID readers S21 to S28 disposed at predefined intervals around the head 11 can be inspected with high accuracy easily and instantly. Further, since the robot R is rotated at the reference position 1 according to the movements of the legs 13 thereof, whether or not the rotation is performed normally at the specific position can be confirmed.

What is claimed is:

1. A performance inspection method for an autonomous mobile apparatus which is capable of performing free motions autonomously according to communication with a remote operation device, mounted with a plurality of detection elements having mutually different detection regions and configured to detect a specific subject in a surrounding environment thereof, the performance inspection method being configured to inspect whether or not each detection element is functioning normally, wherein the autonomous mobile apparatus includes a main body and a locomotion mechanism mounted in the main body to navigate the main body and rotate the main body at a specific position, and the performance inspection method comprises:
a position adjusting step configured to locate the autonomous mobile apparatus at a reference position and confront the autonomous mobile apparatus to the subject with a predefined distance;
a rotation step configured to confront the autonomous mobile apparatus to a plurality of predefined directions sequentially by rotating the autonomous mobile apparatus at the reference position via the locomotion mechanism;
a detection processing step configured to detect the subject via each detection element every time when the autonomous mobile apparatus is confronted to each direction by the rotation step; and
a determination step configured to determine whether or not each detection element is functioning normally on the basis of the detection processing result from the detection processing step.

2. The performance inspection method according to claim 1, wherein
a plurality of floor marks are set on the circumference of a circle centered at the reference position in accordance with the plurality of predefined directions to be confronted by the autonomous mobile apparatus, and
when the autonomous mobile apparatus is rotated in the rotation step, the autonomous mobile apparatus detects the floor marks and is directed to confront the plurality of predefined directions sequentially on the basis of the floor marks.

3. A performance inspection method for an autonomous mobile apparatus which is capable of performing free motions autonomously according to communication with a remote operation device, mounted with a plurality of detection elements having mutually different detection regions and configured to detect a specific subject in a surrounding environment thereof, the performance inspection method being configured to inspect whether or not each detection element is functioning normally,
wherein the autonomous mobile apparatus includes a main body and a revolving portion capable of revolving freely with respect to the main body, and the plurality of detection elements are mounted in the revolving portion,
the performance inspection method comprises:
a position adjusting step configured to locate the autonomous mobile apparatus at a reference position and confront the autonomous mobile apparatus to the subject with a predefined distance;
a revolution step configured to confront the revolving portion to a plurality of predefined directions sequentially by revolving the revolving portion while maintaining the autonomous mobile apparatus at the reference position;
a detection processing step configured to detect the subject via each detection element every time when the revolving portion is confronted to each direction by the revolution step; and
a determination step configured to determine whether or not each detection element is functioning normally on the basis of the detection processing result from the detection processing step.

4. A performance inspection method for an autonomous mobile apparatus which is capable of performing free motions autonomously according to communication with a remote operation device, mounted with a plurality of detection elements having mutually different detection regions and configured to detect a specific subject in a surrounding environment thereof, the performance inspection method being configured to inspect whether or not each detection element is functioning normally,
wherein the autonomous mobile apparatus includes a main body, a locomotion mechanism mounted in the main body to navigate the main body and rotate the main body at a specific position, and a revolving portion capable of revolving freely with respect to the main body, and the plurality of detection elements are mounted in the revolving portion,
the performance inspection method comprises:
a position adjusting step configured to locate the autonomous mobile apparatus at a reference position and confront the autonomous mobile apparatus to the subject with a predefined distance;
a rotation step configured to confront the autonomous mobile apparatus to a plurality of predefined directions sequentially by rotating the autonomous mobile apparatus at the reference position via the locomotion mechanism;
a revolution step configured to confront the revolving portion to a plurality of predefined directions sequentially by revolving the revolving portion while maintaining the autonomous mobile apparatus at the reference position;
a detection processing step configured to detect the subject via each detection element every time when the revolving portion is confronted to each direction by the rotation step and the revolution step; and
a determination step configured to determine whether or not each detection element is functioning normally on the basis of the detection processing result from the detection processing step.

5. The performance inspection method according to claim 4, wherein
a plurality of floor marks are set on the circumference of a circle centered at the reference position in accordance with the plurality of predefined directions to be confronted by the autonomous mobile apparatus, and
when the autonomous mobile apparatus is rotated in the rotation step, the autonomous mobile apparatus detects the floor marks and is directed to confront the plurality of predefined directions sequentially on the basis of the floor marks.

* * * * *